United States Patent
Beyda et al.

(10) Patent No.: US 6,636,965 B1
(45) Date of Patent: Oct. 21, 2003

(54) EMBEDDING RECIPIENT SPECIFIC COMMENTS IN ELECTRONIC MESSAGES USING ENCRYPTION

(75) Inventors: William J. Beyda, Cupertino, CA (US); Shmuel Shaffer, Palo Alto, CA (US)

(73) Assignee: Siemens Information & Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/282,479

(22) Filed: Mar. 31, 1999

(51) Int. Cl.$^7$ ................................................. H04L 9/00
(52) U.S. Cl. ........................ 713/152; 713/165; 713/154; 709/206
(58) Field of Search ................................ 713/171, 162, 713/163, 154, 200; 709/207, 240, 232; 705/64–70, 75

(56) References Cited

U.S. PATENT DOCUMENTS

| | | | |
|---|---|---|---|
| 4,888,800 A | * 12/1989 | Marshall et al. | 380/281 |
| 5,515,491 A | 5/1996 | Bates et al. | |
| 5,781,732 A | 7/1998 | Adams | |
| 5,889,943 A | * 3/1999 | Ji et al. | 713/201 |
| 6,192,396 B1 | * 2/2001 | Kohler | 709/206 |

FOREIGN PATENT DOCUMENTS

| | | | |
|---|---|---|---|
| EP | 0 306 781 A2 A3 | 3/1989 | |
| EP | 0 375 143 A2 A3 | 6/1990 | |

OTHER PUBLICATIONS

M2 Presswire, "NORTEL: Nortel delivers unified messaging to Microsoft & Lotus e-mail inboxes with Messanger 3.0" Feb. 25, 1998, pp. 1–2.*
Network Computing Oct. 15, 1997, Philip Carden, "Stored file encryption: Boiled eggs and scrambled data", p. 2.*
Feb. 1999, www.securitydynamics.com/products/datasheets/secupc.html.*

* cited by examiner

*Primary Examiner*—Gilberto Barrón
*Assistant Examiner*—Christopher Brown

(57) ABSTRACT

A message processing system allows a user to create messages for delivery to a number of recipients. In addition, the user can create one or more comments or special instructions in the message that are to be delivered to fewer than all of the recipients of the common message. The comments are encrypted such that they cannot be accessed by all recipients of the message but only selected recipients of the message. The message processing system may decrypt the comments and include them along with the common portion of the message prior to delivery to those recipients that are to receive the comments. Alternatively, a recipient of a common portion of a message selects an icon or other prompt indicating that a comment is attached to the message. The recipient is asked to enter a password or other security code that causes the messaging system to determine whether the recipient is to receive a comment and if so, to decrypt the attached comment.

12 Claims, 4 Drawing Sheets

EMBEDDING RECIPIENT SPECIFIC COMMENTS IN ELECTRONIC MESSAGES USING ENCRYPTION

BACKGROUND OF THE INVENTION

The present invention relates to messaging systems in general, and in particular to enhancements to electronic messaging systems such as voice mail, e-mail or multimedia messaging systems.

E-mail and voice mail are rapidly becoming the communication media of choice, as compared to the practice of drafting and circulating written memorandums, for many businesses and individuals. While voice mail and e-mail allow information to be disseminated rapidly to a number of recipients, it has generally been difficult to create customized messages for particular recipients without generating each message individually. For example, a president of a company may wish to inform the employees of a meeting to be held at a specific time and place. Therefore, the president drafts an e-mail message to be sent to all employees informing them of the meeting. In addition, the president may ask certain managers to be prepared to discuss particular items at the meeting but for some reason does not want all employees to know this fact. In the past, if the president wanted to inform the managers of their discussion topics, separate messages had to be created and sent to each manager. Often, to give the appearance that everyone gets the same message, the main message would be sent to everyone and then resent with comments to a smaller group, e.g., managers. This results in the message sender having to send the same message (with variations depending on the distribution) multiple times, and some recipients would be forced to spend unnecessary time in opening and handling the multiple messages. In order to communicate the same main message to all employees and to provide additional information to selected group(s) of those employees, multiple messages with different distribution lists would need to be created, sent and opened. Besides being inconvenient to users, this approach can also create bandwidth issues in some types of messaging systems on, for example, local area networks.

From the above discussion, it is seen that more convenient and efficient messaging systems that allow sending a general message with private comments for selected recipients are desirable.

SUMMARY OF THE INVENTION

The present invention allows a user to efficiently create customized e-mail, voice mail or multimedia messages by creating a common portion of a message which is to be sent to a number of recipients, creating one or more comments which are attached to the common message portion for receipt by one or more particular recipients. Then, the user can cause the message with comment(s) to be sent to the recipients by the messaging system. The comments are encrypted such that they cannot be read or heard by all recipients but only by the intended recipient(s).

In one embodiment of the invention, the messaging system analyzes an address list containing the recipients to whom the message is to be addressed. If a recipient has been designated to receive the comment, the comment is decrypted and included with the common message portion before transmission to the recipient. If the recipient is not designated to receive the comment, then the messaging system transmits only the common message portion to the recipient.

In another embodiment of the invention, the common message portion is transmitted to all recipients along with an icon or other prompt indicating that a comment is attached to the message. Upon selecting the icon or prompt, the messaging system asks the recipient for a password or other security code. If the password is entered correctly, the messaging system checks to see whether the recipient is on a list of recipients to receive the comment, and if the recipient is on the list, decrypts the comment for the recipient.

These and other embodiments of the invention, as well as its advantages, will be described in more detail below in conjunction with the following drawings.

DETAILED DESCRIPTION OF THE SPECIFIC EMBODIMENTS

The present invention provides a message processing system that allows a user to attach comments to a common message for general distribution, wherein the comments are to be received by fewer than all recipients of the common message.

Figure 1:
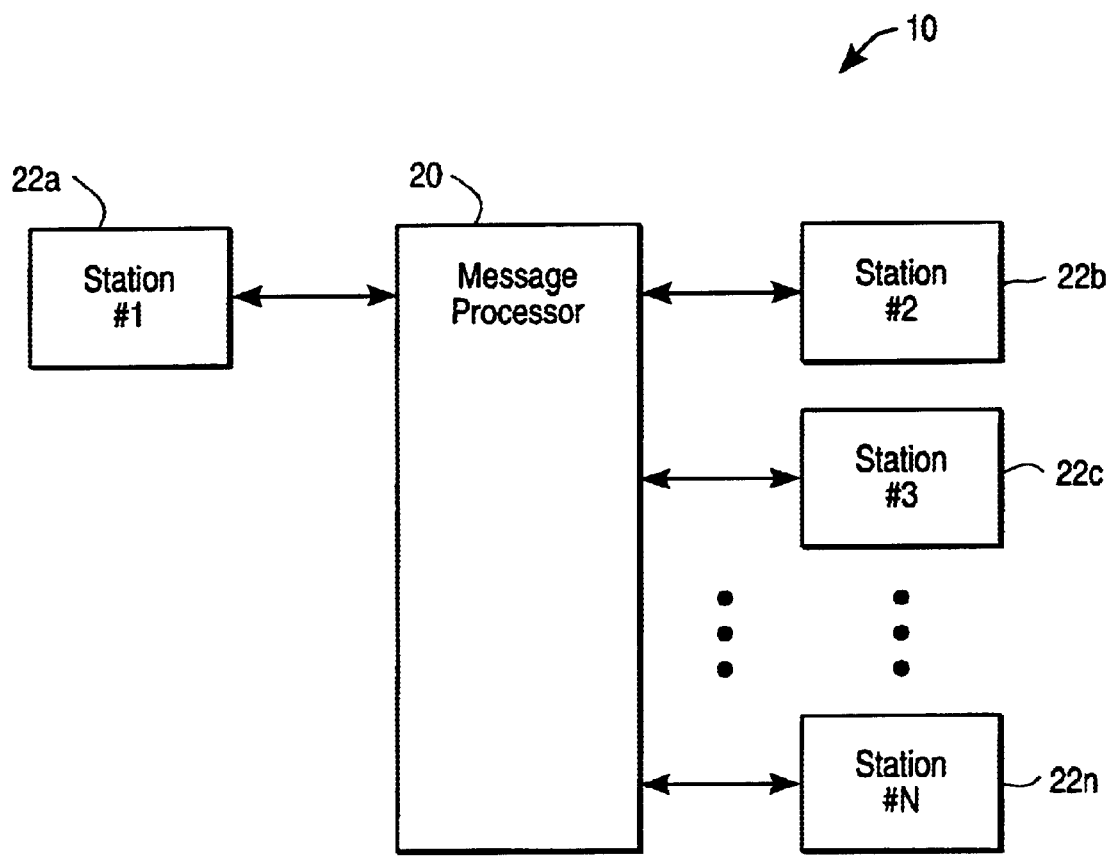
FIG. 1 is a block diagram of a message processing system according to the resent invention.

A block diagram of a message processing system according to the present invention is shown in FIG. 1. The system 10 includes a message processor 20 that operates to receive and send messages between any number of user stations 22a, 22b, 22c, . . . 22n. In one embodiment of the invention, the message processor 20 may be an e-mail server and the user stations 22 are personal computers that are logically connected to the e-mail server by a local area network or a wide area network such as the Internet. A user of station 22a wishing to generate an e-mail message for distribution to other users, types the message on his local station 22a along with an address list of recipients and forwards the message to the message processor 20. The message processor 20 then routes the message to the recipients at the other stations 22b–22n. In another embodiment of the invention, the message processor 20 may be a voice mail system that is typically included as part of a private branch exchange (PBX) telephone system. Each of the stations 22a–22n comprises telephones with which voice mail messages may be entered or received. A user of the station 22a creates a voice message by recording the message and designating one or more recipients to whom the message is to be transmitted. The recorded message is transmitted to the recipients by the message processor 20.

As discussed earlier, if a user wished to create a common message for distribution to a number of recipients and add a comment or particular instructions to be delivered to fewer than all the recipients of the common message, it had been necessary for the user to create and send separate messages to those recipients of the common message and to those recipients who were to receive the particular instructions or comments. The present invention provides the ability to create customized messages for a recipient by allowing a user to create a single message containing a common message for general distribution and comments that can only be received by selected individuals.

Figure 2:
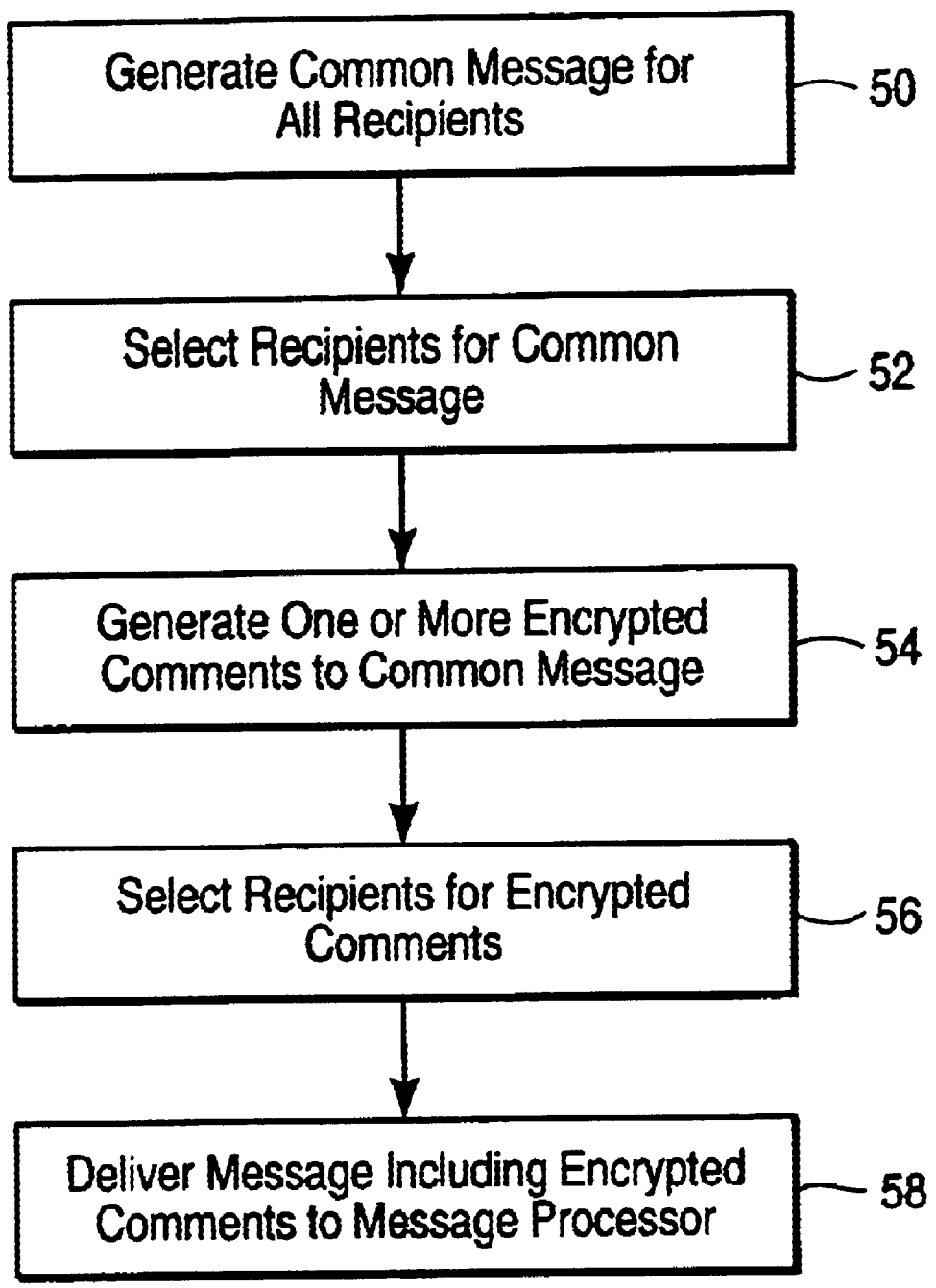
FIG. 2 is a flow chart of the steps performed by a user to create a message having comments that are transmitted to fewer than all of the recipients of a common portion of the message in accordance with the present invention.

FIG. 2 illustrates a flow chart of creating a customized message according to the present invention. Beginning at a step 50, a sending user generates a common message that is to be transmitted to all recipients. This message may be an e-mail message, a voice mail message, or a multimedia message such as an audio or video clip, etc. At a step 52, the sending user selects the recipients of the common message. At a step 54, the sending user generates one or more comments in the common message, where the comments are to be sent to fewer than all of the recipients of the common message portion. The comments may ask those recipients to perform some particular action or provide additional information to that contained in the common message. It is generally desirable that the comments not be readily accessed by each recipient of the common portion of the message. Therefore, the messaging system of the present invention generally encrypts the comments such that it cannot be understood by everyone who receives the common message unless the particular recipient is one of the selected recipients for the comments. At a step 56, the sending user creates an address list of the recipients who are authorized to receive the comments created at step 54. At a step 58, the common portion of the message including its address list, and the comments and its address list are delivered to the message processor for delivery to each recipient.

Figure 3:
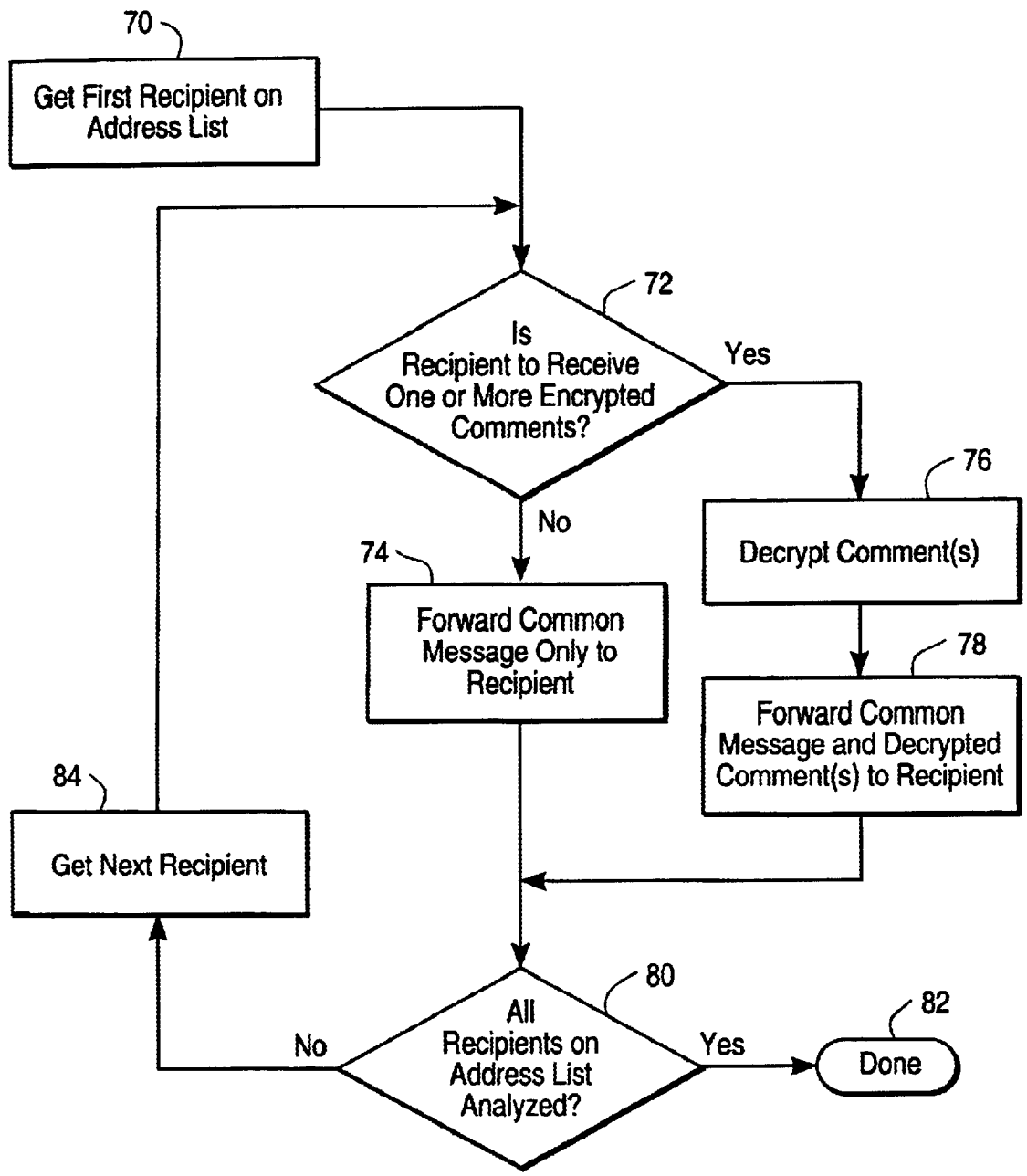
FIG. 3 is a flow chart of the steps performed by the messaging system of the present invention to forward a comment to particular recipients of a common message.

FIG. 3 illustrates one embodiment of the present invention whereby the message processor determines whether a recipient is to receive either just the common portion of a message or the common portion with one or more of the comments. In the example shown in FIG. 3, this processing is performed in the message processor prior to delivery of the message to the recipients. This process may be advantageous in a client/server architecture where it is desirable to limit the transmission of unnecessary data to each recipient in order to avoid unnecessary consumption of network bandwidth.

Beginning at a step 70, the message processor analyzes the first recipient on the address list for the common portion of a message. At a step 74, the message processing system determines whether the recipient is also to receive one or more comments that accompany the common portion of the message. Whether a recipient is to receive a comment is preferably determined by the presence of the recipient's name, e-mail address, or telephone extension on the address list for the common portion of the message and on the address list for the comments. If the answer to step 74 is no, then the messaging system forwards only the common portion of the message to that recipient. If the answer to step 74 is yes, the encrypted comment(s) is decrypted at step 76. At a step 78, the decrypted comment and common portion of the message are forwarded to the recipient for their review.

At a step 80, the message processor determines if all recipients on the address list for the common portion of the message have been analyzed. If so, processing ends at step 82. If not, the next recipient on the address list is obtained at step 84 and processing returns to step 72 until all the recipients have been analyzed.

Figure 4:
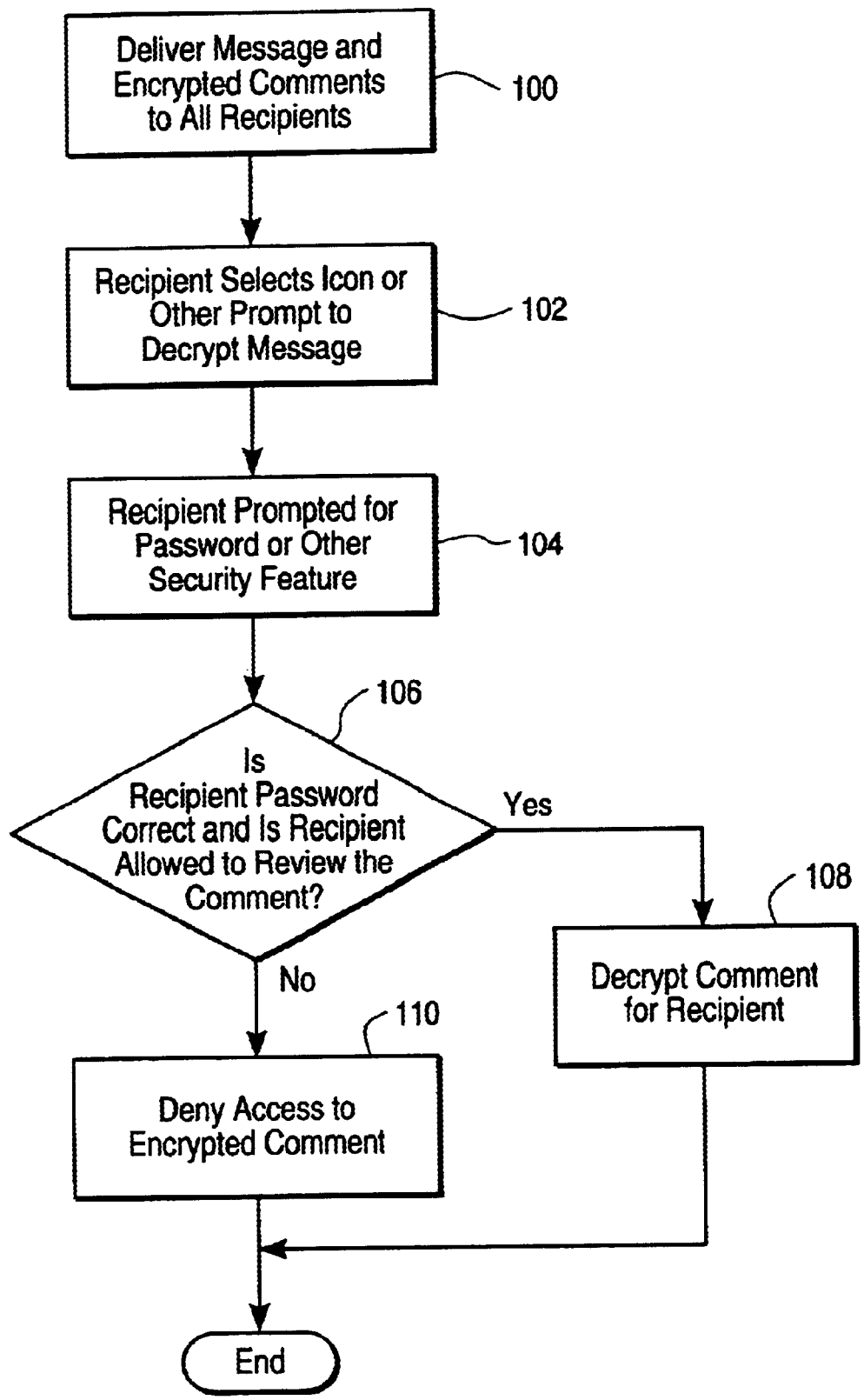
FIG. 4 is a flow chart of the steps performed by the messaging system to forward the comments to particular recipients of a common message according to another aspect of the present invention.

As will be appreciated from viewing the steps in FIG. 3, creating customized messages for each recipient prior to the delivery may require that multiple copies of the message be stored at the message processor. In some instances, the memory of the message processor may be scarce and therefore it is desirable to limit the storage of unnecessary copies of the message. In this case, the processing shown in FIG. 4 is used. In this embodiment, a recipient of a common message is not provided with an encrypted comment until that recipient asks the message processor for the comment.

Beginning with a step 100, the message processor delivers the common portion of a message and any encrypted comments to all recipients. Accompanying the message is an icon or other prompt indicating that there is a comment attached to the message. At a step 102, the recipient interacts with their station at which they receive the messages to select the icon or other prompt required to review an encrypted comment. For example, in an e-mail system, there may be visual icon that can be selected by the user. In a voice mail system, the system may provide a voice prompt asking a recipient to select a particular key to receive an encrypted comment.

At a step 104, the message processing system asks the recipient for a password or some other security code. At a step 106, the message processor determines whether the recipient has entered the correct password or security code and also determines whether the recipient is on an address list of those people selected to receive the comment. If the answer to step 106 is yes, the messaging system enables the decryption of the comment for review by the authorized recipient at a step 108. If the recipient does not enter the correct password or security code or the recipient is not on the list of recipients selected to receive an encrypted comment, then that recipient is denied access to the encrypted comment at a step 110.

The process outlined in steps 100–110 may be carried out by transmitting information between the user stations at which a message is received and the message processor (for example, depending on whether the correct password is provided to message processor by a recipient requesting access to the encrypted comment, the message processor does or does not enable the recipient's station to decrypt the comment). Alternatively, the message processor may send the encrypted comments as an applet or mini-program that contains the instructions required for the local processor found at the user stations to determine whether the user has entered the correct password or security code, to determine whether the recipient is to receive an encrypted comment, and to perform the decryption of the encrypted comment. In yet another embodiment, the fact that a user has successfully logged into their e-mail server or other messaging server may serve as a sufficient security check for the user to decrypt an encoded comment.

It should be noted that in some embodiments, the message processing system may be provided with configuration options to perform in accordance with either of the embodiments of FIG. 3 or FIG. 4.

As can be seen from the above, the present invention allows a sending user to create customized comments for selected ones of the recipients of a common message without requiring the sending user to send separate messages to the recipients of a comment. The comments may be in the nature of additional text, voice message or video clips. Alternatively, the comment may consist of highlighting of particular words or phrases in the common portion of a message.

While specific embodiments of the invention have been illustrated and described, it will be appreciated that various changes can be made therein without departing from the scope of the invention. For example, although the present invention is described with respect to e-mail systems, voice mail systems and multimedia messaging systems, those skilled in the art will recognize that any type of electronic messaging system may be adapted to incorporate the enhancements of the present invention.

What is claimed:

1. A method of sending messages in an electronic messaging system, comprising:

creating an electronic message with a common message portion that is to be delivered to a number of recipients;

creating a comment to said common message portion in said electronic message, wherein said comment can be received only by a selected subset of said number of recipients;

determining said number of recipients and said selected subset by creating a first address list that specifies said number of recipients and creating a second address list that specifies said selected subset;

delivering said common message portion and said comment to said number of recipients by:

encrypting said comment;

transmitting said common message portion and said encrypted comment to said number of recipients; and determining whether a particular recipient is allowed to decode said encrypted comment by transmitting an icon or instruction with said common message portion and said encrypted comment and determining if said particular recipient has selected the icon or performed the instruction and if so, determining if said particular recipient is on said second address list of said number of recipients selected to review said comment.

2. The method of claim 1, further comprising:

prompting the particular recipient for a password of security code prior to decoding said encrypted comment for the particular recipient.

3. The method of claim 1, wherein the icon or instruction is transmitted by transmitting an applet-or mini-program with said common message portion and said encrypted comment.

4. The method of claim 1, wherein the electronic messaging system is an e-mail server coupled to user stations comprising computers.

5. The method of claim 1, wherein the electronic messaging system is a multimedia messaging system.

6. A system for delivering electronic messages to one or more recipients, comprising:

a plurality of user stations at which a user enters and receives electronic messages, wherein one of said plurality of users creates an electronic message with a common message portion that is to be delivered to recipients at a number of said user stations and also creates a comment to said common message portion of said electronic message, wherein said comment can be reviewed only by selected recipients at a selected subset of said number of said user stations;

a message processor coupled to the plurality of user stations, the message processor being programmed to:

encrypt said comment;

transmit said common message portion without said comment to a list of recipients on a first address list and transmit said common message portion with said encrypted comment to selected recipients on a second address list;

determine whether a particular recipient is allowed to decode said encrypted comment by:

transmitting an icon or instruction with said common message portion and said encrypted comment; and determining if said particular recipient has selected the icon or performed the instruction and if so, determining if said particular recipient is on said second address list of said selected recipients to review said comment.

7. The system of claim 6, wherein said message processor prompts the particular recipient for a password or security code prior to decoding said encrypted comment for the particular recipient.

8. The system of claim 6, wherein the message processor transmits said icon or instruction by transmitting an applet or mini program with said common message portion and said encrypted comment.

9. The system of claim 6, wherein the message processor is an e-mail server coupled to user stations comprising computers.

10. The system of claim 6, wherein the message processor is a multimedia messaging system.

11. A system for sending messages in an e-mail messaging system, comprising:

a plurality of user stations at which a user enters and receives electronic messages, wherein said messages include a common message portion that is to be delivered to recipients at a number of said user stations and a comment that is to be received by a selected subset of recipients;

a message processor coupled to the plurality of user stations, the message processor being programmed to:

transmit said common message portion without said comment to said recipients and transmit an encrypted comment along with an icon or instruction to said selected subset of recipients; and determine whether a particular recipient has selected the icon or performed the instruction and if so to decode the encrypted comment for review by the particular recipient.

12. The system of claim 11, wherein the message processor is programmed to prompt the particular user for a password or security code upon selecting the icon or performing the instruction.

\* \* \* \* \*